United States Patent [19]
Atkins

[11] 3,874,085
[45] Apr. 1, 1975

[54] PASTA GAUGE

[76] Inventor: William F. Atkins, P.O. Box 1812, Carmel, Calif. 93921

[22] Filed: May 23, 1973

[21] Appl. No.: 363,274

[52] U.S. Cl............................... 33/174 T, 33/178 B
[51] Int. Cl. .............................................. G01b 3/34
[58] Field of Search .......... 33/174 T, 174 H, 174 D, 33/178 B, 199 R, 1 F

[56] References Cited
UNITED STATES PATENTS
| | | | |
|---|---|---|---|
| 1,025,255 | 5/1912 | Driver | 33/178 B |
| 2,166,650 | 7/1939 | Townsend | 33/178 B |

FOREIGN PATENTS OR APPLICATIONS
| | | | |
|---|---|---|---|
| 525,373 | 3/1955 | Italy | 33/178 B |

Primary Examiner—Harry N. Haroian
Assistant Examiner—Richard R. Stearns
Attorney, Agent, or Firm—Limbach, Limbach & Sutton

[57] ABSTRACT

A pasta gauge for mechanically selecting specific quantities of elongated dried pasta, such as spaghetti, the gauge having a body with a top surface and a plurality of different sized vertical, cylindrical bores each intersecting the top surface in a circular aperture, each aperture representing a predetermined number of serving portions which portions of a plurality of dried pasta members are selected by grasping a larger bundle of pasta noodles, supporting them against the surface over a selected aperture and allowing the desired portion to slide into the aperture and be separated from the remaining pasta noodles in the bundle.

3 Claims, 4 Drawing Figures

PATENTED APR 1 1975  3,874,085

3,874,085

PASTA GAUGE

BACKGROUND AND SUMMARY OF THE INVENTION

Because of the expansion of dried pasta noodles, such as spaghetti and vermicelli, upon cooking, it is difficult to predict the proper quantity of noodles necessary for a specific number of portions. While package guides illustrating bundle diameters are helpful, they are not wholly satisfactory in providing a means for quickly and accurately selecting the quantity desired.

An apparatus has been devised by which a desired quantity of a plurality of dried, elongated pasta noodles, such as spaghetti and vermicelli, can be quickly and accurately selected for the number of serving portions desired.

The gauge includes a body having a top surface and a plurality of different sized cylindrical bores, each intersecting the top surface in a circular aperture, each aperture having a predetermined diameter representing an integral number of serving portions of a plurality of Pasta noodles. A predetermined quantity of dried pasta noodles can be selected by insertion of a quantity of noodles sufficient to fill a selected aperture of the gauge. The diameters of the cylindrical apertures of the gauge are pre-selected on the basis of predetermined average serving portions, i.e., the smallest diameter representing a single serving, the next larger diameter two servings, and the next larger, three servings. Three apertures in the pasta gauge are preferred since a greater number of servings can be obtained by a simple combination of the apertures.

Using the gauge, an astute cook can make an accurate judgment whether to add or remove noodles for a particular cooking requirement after only a little experience. In this respect, the gauge provides an accurate starting point from which educated variations can be made.

The pasta gauge can be constructed in a variety of embodiments. For example, it may comprise a decorative wooden block, a roller or even a flat plate that can be seated across the top of an open pot allowing pasta to be directly disposed into the cooking water.

DETAILED DESCRIPTION OF THE PREFERRED EMBODIMENT

Figure 1:
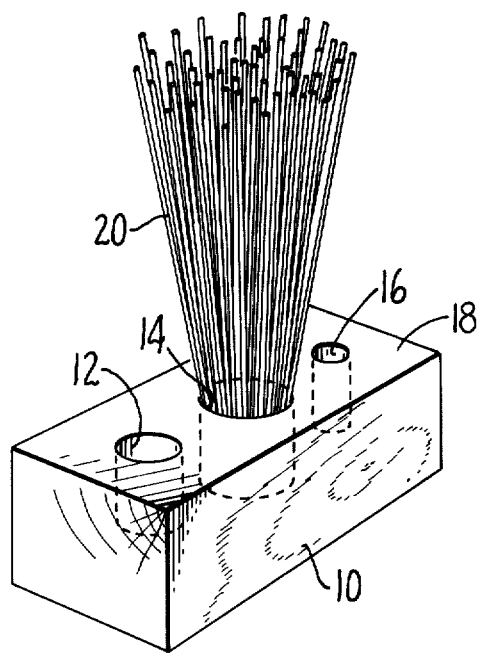
FIG. 1 is a perspective view of a pasta gauge in the embodiment of a wooden block.

Referring to the drawings, several embodiments are illustrated which disclose several variations in the form of the pasta gauge. For example, in FIG. 1, a decorative wooden body block 10 is shown with three vertical cylindrical holes or bores 12, 14 and 16, respectively, each intersecting the top surface 18 of the block 10 in a circular aperture. The cylindrical bores are formed to a depth not quite equal to the thickness of the block 10, thereby providing a bottom (in phantom) suitable for the support of elongated, dried pasta noodles, such as the spaghetti 20 shown in FIG. 1.

Each of the apertures has a diameter predetermined to provide a specific integral number of serving portions when filled with a plurality of spaghetti or other dried, elongated pasta noodles. Since substantially different types of noodles may require a different diameter to provide, for example, a single serving portion, it is contemplated that entirely separate gauges may be required for substantially different type noodles. However, for the most common sizes of spaghetti and vermicelli, a single gauge will be adequate.

In FIG. 1, the smallest aperture bore 16 represents the necessary size of a bundle of spaghetti for a single serving. Similarly, the next larger aperture bore 12 represents the size for two servings. Finally, the largest aperture bore 14, shown here filled with a quntity of spaghetti, represents the size for three servings. It is contemplated that if a larger number of servings is required, a combination of more than one aperture may be used. The block 10 may be naturally or decoratively finished to provide an attractive functional item for the kitchen.

Figure 2:
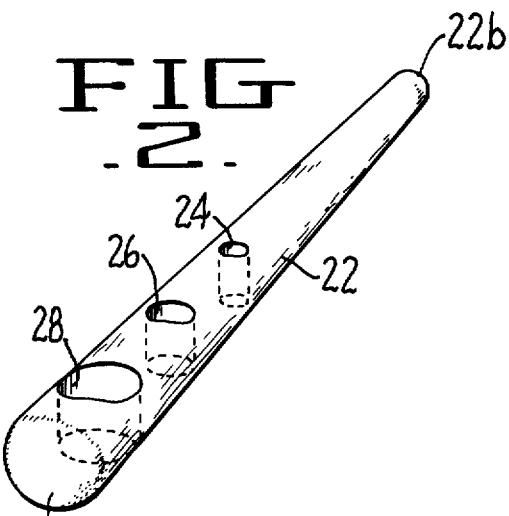
FIG. 2 is a perspective view of a pasta gauge in the embodiment of a wooden roller.

While the pasta gauge is largely functional, the ornamental character of the gauge can be emphasized by combining the functional gauge with a decorative item. For example, with reference to FIG. 2, the gauge is in the form of a wooden roller body 22. When using a roller 22 of the type having one end 22a of a larger diameter than the other end 22b, three bores 24, 26 and 28 can be arranged on the roller 22 in ascending size. In the embodiment of FIG. 2, the bores 24, 26 and 28 pass through the diameter of the roller to exemplify an alternate arrangement to the embodiment of FIG. 1. The pasta gauge of FIG. 2 can be used by grasping the roller in one hand at the small end, holding the roller over a counter top (not shown), grasping a bundle of noodles in the other hand and inserting the noodles through the selected bore aperture. The aperture retains a predetermined portion of the noodles as represented by the gauge selected.

Figure 3:
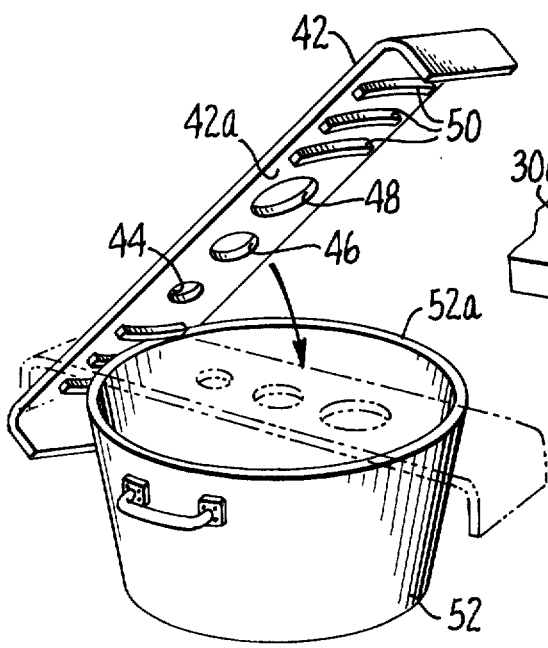
FIG. 3 is a perspective view of a pasta gauge in the embodiment of a plate.

With reference to FIG. 3, the functional character of the pasta gauge is emphasized. The gauge is formed from an elongated rectangular plate body 30 having contoured ends 30a formed in a 90° bend to provide two legs which raise the plate above a support counter surface 32 as shown. Again, three bores 34, 36 and 28 are formed by holes through the plate 30 and sized to contain specific integral serving portions of of a plurality of noodles in the same manner as the bore apertures of the block and roller. As shown in FIG. 3, a bundle 40 of spaghetti noodles are held over the aperture of bore 36. Those noodles 40a filling the aperture of bore 36 drop to the counter surface 32. Those noodles which remain on the top of the plate 30 are selectively removed.

In addition to being adapted for counter top use, the pasta gauge of FIG. 3 is adapted to be seated on top of a pot to allow the noodles inserted in an aperture to drop directly into cooking water. To accommodate pots of different size, the overall length of the gauge may differ, the purchaser of the gauge selecting one or more suitable sizes.

Figure 4:
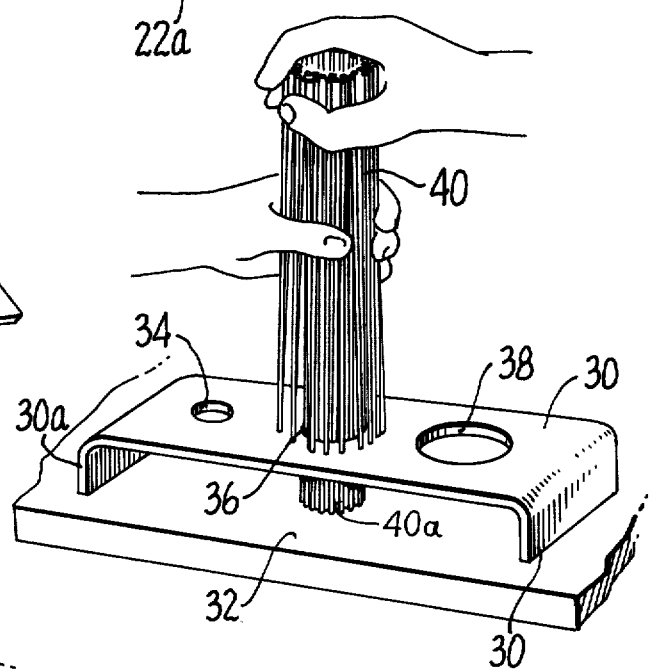
FIG. 4 is a perspective view of a pasta gauge in the embodiment of a modified plate.

Alternately, as shown in FIG. 4, a pasta gauge comprising a modified plate 42 having a plurality of centrally located apertures 44, 46 and 48 is adaptable for use of different sized pots by the inclusion of a plurality of pairs of concentrically curved ridges 50 projecting downwardly on the underside 42a of the plate on opposite ends of the row of circular apertures, each pair of ridges spaced apart by a different diameter distance. In this manner, the plate as shown in phantom in FIG. 4 can be seated on a pot 52, of random size, and be stably positioned thereon by the restricting effect of the ridges 50 with the lip 52a of the pot.

The four embodiments shown in the drawings exemplify various arrangements of the pasta gauge of this invention as defined in the following claims.

I claim:

1. A pasta gauge for selecting a predetermined serving portion of a plurality of elongated, dried pasta members from a larger bundle of elongate, dried pasta members comprising:
    an elongate flat plate member having a top surface and a plurality of spaced apart, hollow, generally cylindrical, vertical bores therein intersecting said top surface perpendicularly in a plurality of spaced apart circular apertures;
    each aperture and the associated bore having a predetermined diameter different from the diameter of the other of said apertures and representing, when filled with a bundle of elongate, dried pasta members, an integral number of serving portions each containing a plurality of dried pasta members;
    leg means depending downwardly from said plate member for locating said top surface above a supporting structure, said leg means being shorter than the length of the pasta members;
    said top surface defining an area surrounding each aperture for supporting the balance of the larger bundle of pasta members apart from the desired serving portion of pasta members which drop by gravity through the aperture down to the supporting structure, whereby the pasta members on the supporting structure may be separated from the pasta members supported on said top surface.

2. The pasta gauge of claim 1 wherein said plate member includes a plurality of complementary pairs of concentric curved ridges spaced outwardly of said plate on opposite ends of said plurality of circular apertures and projecting downwardly from the bottom surface of said plate member, each pair of ridges spaced apart by a different diameter distance for locating said pasta gauge over the top openings of different sized pots.

3. A method of selecting a predetermined serving portion of a plurality of elongated, dried pasta members from a larger bundle of elongate, dried pasta members comprising the steps of:
    establishing a generally horizontal surface having therein a plurality of spaced apart openings, each opening into a vertical bore and with each opening defining a different integral number of servings of a plurality of elongate, dried pasta members when located therein;
    positioning a larger bundle of elongate, dried pasta members than the desired predetermined serving portion of such elongate, dried pasta members on said surface over a predetermined one of said openings;
    permitting the desired predetermined serving portion of a plurality of elongate, dried pasta members to drop by gravity through said predetermined one of said openings while supporting the remainder of the larger bundle of elongate, dried pasta members on the horizontal surface; and
    separating the remainder of the larger bundle of elongate, dried pasta members supported on said horizontal surface from the predetermined serving portion of elongate, dried pasta members which has dropped through said opening.

* * * * *